(12) United States Patent
Kim et al.

(10) Patent No.: US 10,572,797 B2
(45) Date of Patent: Feb. 25, 2020

(54) APPARATUS AND METHOD FOR CLASSIFYING HOME APPLIANCES BASED ON POWER CONSUMPTION USING DEEP LEARNING

(71) Applicant: Pusan National University Industry—University Cooperation Foundation, Busan (KR)

(72) Inventors: Howon Kim, Busan (KR); Jihyun Kim, Busan (KR)

(73) Assignee: Pusan National University Industry—University Cooperation Foundation, Busan (KR)

( * ) Notice: Subject to any disclaimer, the term of this patent is extended or adjusted under 35 U.S.C. 154(b) by 591 days.

(21) Appl. No.: 15/336,086

(22) Filed: Oct. 27, 2016

(65) Prior Publication Data
US 2017/0116511 A1    Apr. 27, 2017

(30) Foreign Application Priority Data

Oct. 27, 2015 (KR) .......... 10-2015-0149595
Sep. 30, 2016 (KR) .......... 10-2016-0126193

(51) Int. Cl.
*G06N 3/04* (2006.01)
*H04L 12/28* (2006.01)

(52) U.S. Cl.
CPC ....... *G06N 3/0445* (2013.01); *H04L 12/2825* (2013.01)

(58) Field of Classification Search
CPC ........ G06N 20/00; G06N 5/025; G06N 5/047; G06N 3/063; G01N 33/0075; G01N 21/84; G01N 33/0031; G06Q 50/06
See application file for complete search history.

(56) References Cited

U.S. PATENT DOCUMENTS

2013/0289788 A1* 10/2013 Gupta .................. G05B 13/02
                                                                     700/291

FOREIGN PATENT DOCUMENTS

JP     2013-048326 A    3/2013
JP     2013-218715 A   10/2013

OTHER PUBLICATIONS

J. Kelly and W. Knottenbelt, "Neural NILM: Deep Neural Networks Applied to Energy Disaggregation," Sep. 2015, coRR, abs/1507.06594, pp. 1-10 (Year: 2015).*

* cited by examiner

*Primary Examiner* — Eric Nilsson
*Assistant Examiner* — Catherine F Lee
(74) *Attorney, Agent, or Firm* — Rabin & Berdo, P.C.

(57) ABSTRACT

Provided are an apparatus and method for classifying home appliances based on power consumption using deep learning, which can efficiently classify home appliances in use by applying deep learning and analyzing power data collected from a house. The apparatus includes a home appliance classification model creation module configured to encode power consumption data collected from a house to learn a home appliance classification model and create an RNN-based home appliance classification model and a home appliance classification module configured to collect and encode data on power consumption currently in use and classify home appliances using the home appliance classification model created by the home appliance classification model creation module.

9 Claims, 12 Drawing Sheets

APPARATUS AND METHOD FOR CLASSIFYING HOME APPLIANCES BASED ON POWER CONSUMPTION USING DEEP LEARNING

CROSS-REFERENCE TO RELATED APPLICATION

This application claims priority to and the benefit of Korean Patent Application Nos. 2015-0149595 filed on Oct. 27, 2015 and 2016-0126193 filed on Sep. 30, 2016, the disclosure of which is incorporated herein by reference in its entirety.

BACKGROUND

1. Field of the Invention

The present invention relates to home appliance classification based on power consumption, and more particularly, to an apparatus and method for classifying home appliances based on power consumption using deep learning, where home appliances in use may be efficiently classified by applying deep learning to analyze power data collected from a customer's house.

2. Discussion of Related Art

In recent years, globally, there has been increased interest in efficient use of energy because of the depletion of fossil fuels. Accordingly, a smart grid technology that combines ICT technology with an electrical grid has been realized, mainly in developed countries such as the US and Europe.

A smart meter that measures and transmits power consumption in each customer's house is installed to enable monitoring and power usage prediction based on the power consumption.

However, it is difficult to predict energy usage accurately by only collecting total power consumption of a customer's house. In order to more accurately make predictions, it is necessary to collect power consumption information at the stage of the home appliances used in the customer's house.

As a technology for realizing this, non-intrusive Load Monitoring (NILM) is provided.

NILM is a technology for analyzing power data of a customer's house to deduce what appliances are being used. Accordingly, the collection of power consumption information is allowed at the stage of the home appliances by using NILM.

However, home appliance classification models introduced by many studies conducted so far have accuracy that is too low to be commercialized.

Most studies on the power consumption model in NILM have used a factorial hidden Markov model (FHMM), a conditional FHMM (CFHMM), a Hierarchical FHMM (HieFHMM), etc., which are based on a hidden Markov model (HMM).

However, the HMM is a model based on probability of going from the current state to the next state, and thus the conventional models based thereof have two common problems.

First, as the number of home appliances increases, complexity of the models increases, and thus classification accuracy decreases.

Second, the HMM can perform accurate modeling when a home appliance operates with single-state power consumption. However, when a home appliance that operates with multi-state power consumption is modeled, the classification accuracy decreases.

Accordingly, there is a need to develop a new home appliance classification method that can solve the problems of the conventional HMM-based home appliance classification models in order to increase accuracy.

SUMMARY OF THE INVENTION

The present invention is intended to solve the problems of the conventional home appliance classification methods.

The present invention is also directed to an apparatus and method for classifying home appliances based on power consumption using deep learning, where accuracy of a home appliance classification model may be increased by applying a recurrent neural network (RNN)-enhanced model capable of sequential data pattern learning, among deep learning algorithms capable of high-level learning, and by designing a data structure appropriate for the network.

The present invention is also directed to an apparatus and method for classifying home appliances based on power consumption using deep learning, where a home appliance classification model may be created by providing a set of input/output data obtained during a certain period to an RNN so that the RNN can learn the set of input/output data and learn a data pattern corresponding to the period at high level.

The present invention is also directed to an apparatus and method for classifying home appliances based on power consumption using deep learning, where a problem of decreasing accuracy as the number of home appliances increases when classifying home appliances and a problem of decreasing classification accuracy when a home appliance having multi-state power consumption is modeled may be solved.

The present invention is also directed to an apparatus and method for classifying home appliances based on power consumption using deep learning, where accuracy may be increased by measuring a variation while updating a base value of the power consumption with a low pass filter and by encoding a value of measured total power consumption according to the variation.

The present invention is not limited to the above objectives, but other objectives may be clearly understood by those skilled in the art from the following descriptions.

According to an aspect of the present disclosure, there is provided an apparatus for classifying home appliances based on power consumption using deep learning, the apparatus including a home appliance classification model creation module configured to encode power consumption data collected from a customer's house to learn a home appliance classification model and create a recurrent neural network (RNN)-based home appliance classification model; and a home appliance classification module configured to collect and encode data on power consumption data currently in use, classify home appliances using the home appliance classification model created by the home appliance classification model creation module, and output a result of the classification.

The home appliance classification model creation module may include a learning data input unit configured to input the power consumption information collected from the customer's house; a data encoding unit configured to encode the input power consumption information; a home appliance classification model learning unit configured to learn a home appliance classification model using the encoded data; and a home appliance classification model creation unit configured to input new learning data and repeat the above process when a learning error is greater than or equal to a threshold and configured to stop the learning and create a home appliance classification model when the learning error is less than or equal to the threshold.

The home appliance classification module may include a power consumption information collection unit configured to collect data on power consumption currently in use; a power consumption information input unit configured to input the collected power consumption data; a data encoding unit configured to encode the input power consumption data; a home appliance classification unit configured to classify home appliances based on the encoded data; and a classification result output unit configured to output a result of the classification of the home appliances.

According to another aspect of the present disclosure, there is provided a method of classifying home appliances based on power consumption using deep learning, the method including encoding power consumption data collected from a customer's house to learn a home appliance classification model and creating an RNN-based home appliance classification model; and collecting and encoding data on power consumption currently in use, classifying home appliances using the RNN-based home appliance classification model, and outputting a result of the classification.

The creating of an RNN-based home appliance classification model may include inputting the power consumption information collected from the customer's house; encoding the input power consumption information; learning a home appliance classification model using the encoded data; and inputting new learning data and repeating the above process when a learning error is greater than or equal to a threshold and stopping the learning and creating a home appliance classification model when the learning error is less than or equal to the threshold.

The classifying of home appliances and the outputting of a result of the classification may include collecting data on power consumption currently in use; inputting the collected power consumption data; encoding the input power consumption data; classifying home appliances using the RNN-based home appliance classification model based on the encoded data; and outputting a result of the classification of the home appliances.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Hereinafter, exemplary embodiments of an apparatus and method for classifying home appliances based on power consumption using deep learning according to the present invention will be described as follows.

The features and advantages of the apparatus and method for classifying home appliances based on power consumption using deep learning according to the present invention will become apparent from the detailed description of the following embodiments.

Figure 1:
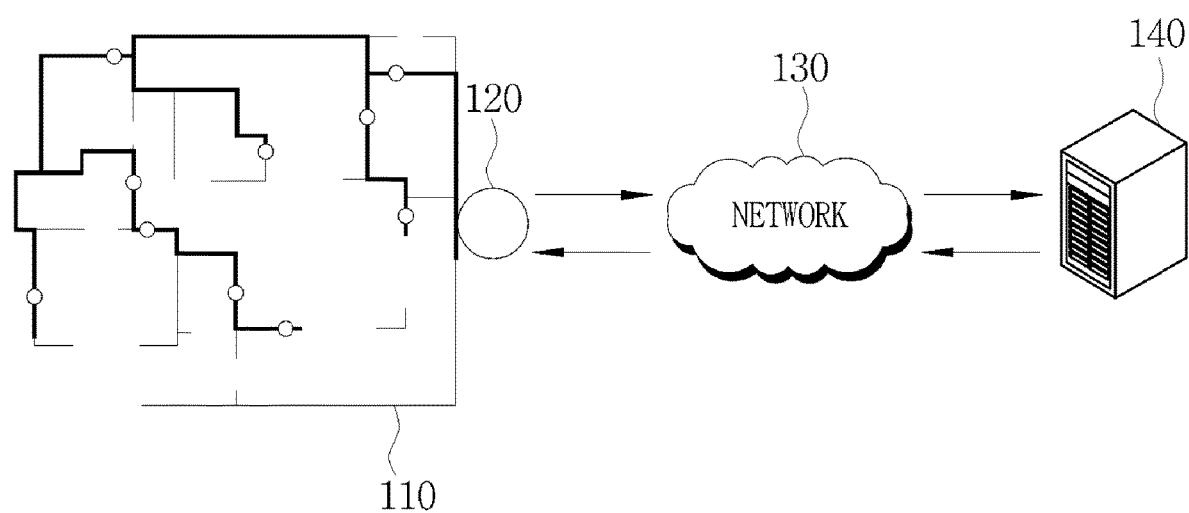
FIG. 1 is a configuration diagram of an apparatus for classifying home appliances based on power consumption using deep learning according to the present invention.
Figure 2:
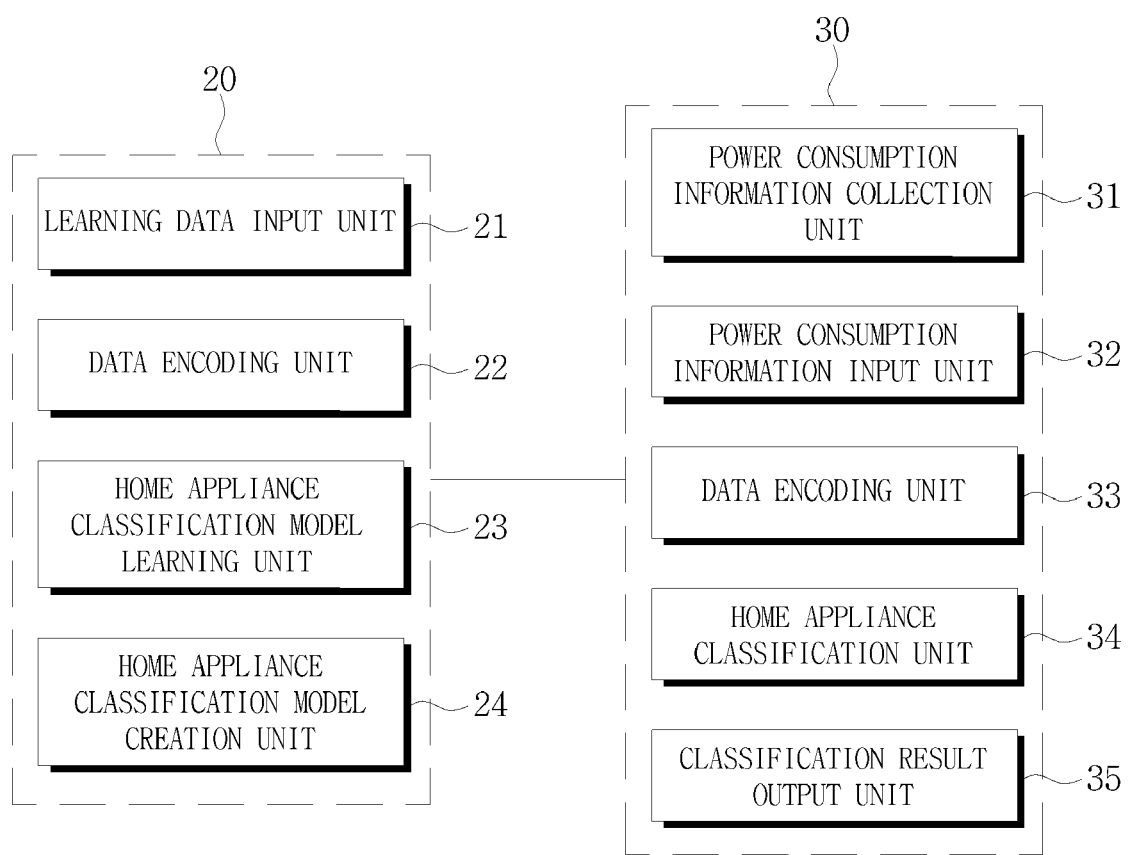
FIG. 2 is a detailed block diagram of an apparatus for classifying home appliances based on power consumption using deep learning according to the present invention.

FIG. 1 is a configuration diagram of an apparatus for classifying home appliances based on power consumption using deep learning according to the present invention, and FIG. 2 is a detailed block diagram of an apparatus for classifying home appliances based on power consumption using deep learning according to the present invention.

The present invention can increase accuracy of a home appliance classification model by applying a recurrent neural network (RNN)-enhanced model capable of sequential data pattern learning, among deep learning algorithms capable of high-level learning, and by designing a data structure appropriate for the network.

To this end, the present invention can create a home appliance classification model by providing a set of input/output data obtained during a certain period to an RNN so that the RNN can learn the set of input/output data and learn a data pattern corresponding to the period at high level.

In order to create the home appliance classification model, the present invention can increase accuracy by measuring a variation while updating a base value of power consumption with a low pass filter during a process of encoding power consumption information and by encoding a value of measured total power consumption according to the variation.

Deep learning is a technology that has become a global issue in the field of artificial intelligence in recent years, where a memory method of a human brain may be emulated and, when provided with learning data, a computer may perform self-learning to discern objects.

An RNN is one of the deep learning algorithms, which is an algorithm that recognizes and learns sequential data. When a set of input/output data obtained during a certain period is provided to and then learned by the RNN, a data pattern during the period is learned at high level to create a home appliance classification model.

The present invention is intended to increase home appliance classification accuracy by applying a deep learning technique to an NILM technology for analyzing power consumption of a customer's house and deducing a home appliance and includes a configuration of creating a home appliance classification model using a deep learning algorithm, a configuration of classifying home appliances, a structure of a new home appliance classification model, a method of encoding input data of a home appliance classification model, and a configuration of an input/output data structure for creating a home appliance classification model.

An entire configuration of a system for classifying home appliances using power consumption information of a customer's house is as shown in FIG. 1.

In a system 100 for classifying home appliances using power consumption information of a customer's house, power consumption information of all home appliances in the customer's house is transmitted to a smart meter 120 through an electrical grid 110. The smart meter 120 transmits the power consumption information of the customer's house to a power supplier through a network 130 at certain intervals.

Here, the network 130 may be a wireless network, such as ZigBee, WiFi, etc., or a wired network, such as power-line communication (PLC), etc. When the power consumption information of the customer's house is transmitted, home appliance use information obtained by performing an analysis through a home appliance classification technique by a home appliance classification server 140 may be delivered back to the customer's house and then used as data for intelligence service.

In detail, as shown in FIG. 2, an apparatus for classifying home appliances based on power consumption using deep learning according to the present invention includes a home appliance classification model creation module 20 configured to create a recurrent neural network (RNN)-based home appliance classification model and a home appliance classification module 30 configured to classify home appliances using the created classification model.

The home appliance classification model creation module 20 includes a learning data input unit 21 configured to input power consumption information collected from a customer's house, a data encoding unit 22 configured to encode the input power consumption information, a home appliance classification model learning unit 23 configured to learn a home appliance classification model using the encoded data, and a home appliance classification model creation unit 24 configured to input new learning data and repeat the above process when a learning error is greater than or equal to a threshold and stop the learning and create a home appliance classification model when the learning error is less than or equal to the threshold.

Also, the home appliance classification module 30 includes a power consumption information collection unit 31 configured to collect data on power consumption currently in use, a power consumption information input unit 32 configured to input the collected power consumption data, a data encoding unit 33 configured to encode the input power consumption data, a home appliance classification unit 34 configured to classify home appliances on the basis of the encoded data, and a classification result output unit 35 configured to output a result of the classification of the home appliances.

A process of creating an RNN-based home appliance classification model and classifying home appliances using the created model according to the present invention will be described as follows.

Figure 3:
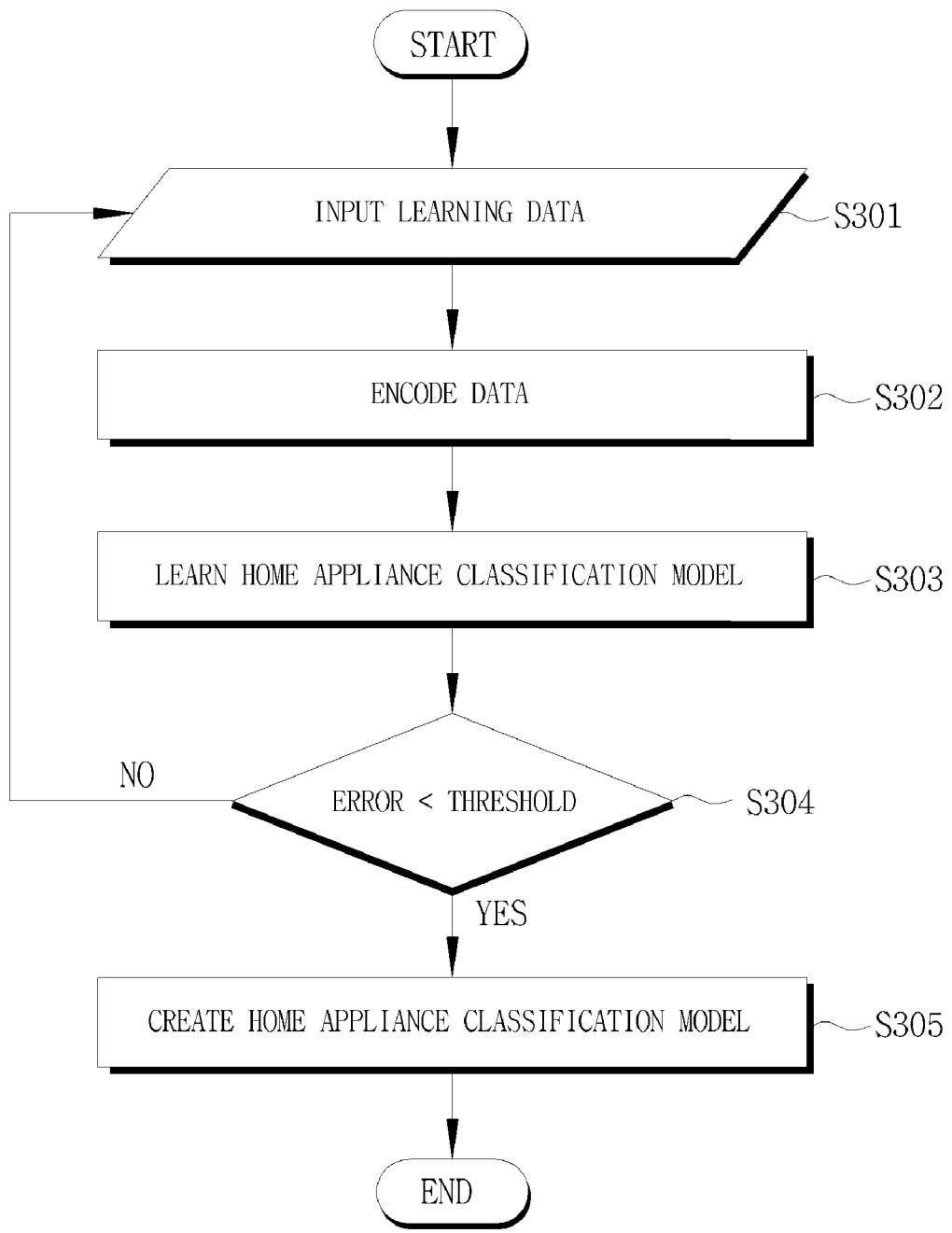
FIG. 3 is a flowchart for creating a recurrent neural network (RNN)-based home appliance classification model according to the present invention.
Figure 4:
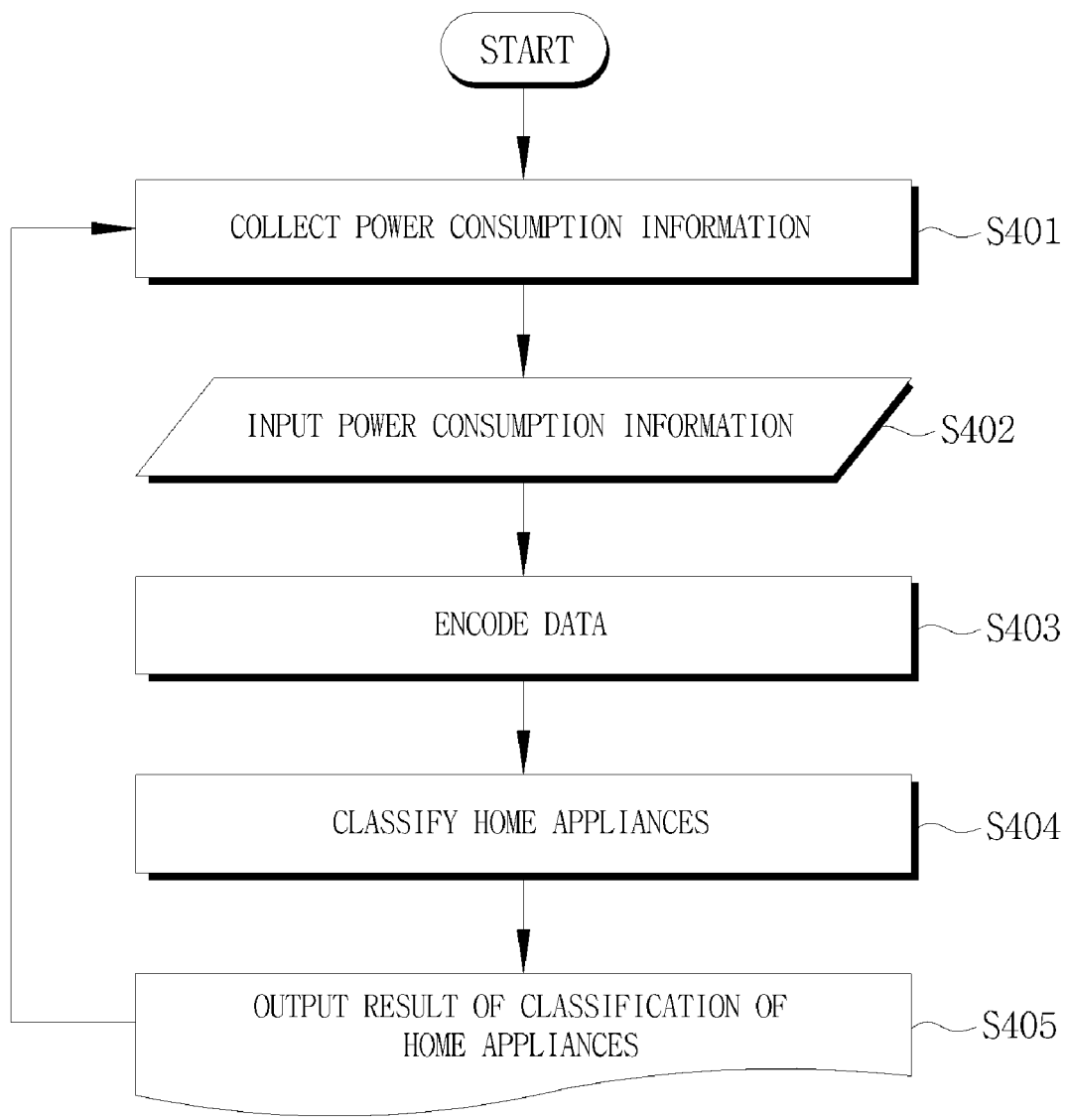
FIG. 4 is a flowchart for classifying home appliances using the created model according to the present invention.

FIG. 3 is a flowchart for creating an RNN-based home appliance classification model according to the present invention, and FIG. 4 is a flowchart for classifying home appliances using the created model according to the present invention.

FIG. 3 shows a process of creating a deep-learning-based home appliance classification model using power consumption information of a customer's house. The RNN-based home appliance classification model is created in the following order.

First, the learning data input unit 21 inputs power consumption information collected from a customer's house (S301).

Next, the data encoding unit 22 encodes the input power consumption information (S302).

Next, the home appliance classification model learning unit 23 learns a home appliance classification model using the encoded data (S303).

Next, the home appliance classification model creation unit 24 inputs new learning data and repeats the above process in response to detection of a learning error being greater than or equal to a threshold (S304) and stops the learning and creates a home appliance classification model in response to detection of the learning error being less than the threshold (S305).

Next, FIG. 4 shows a process of classifying home appliances using the created model according to the present invention. The home appliances are classified in the following order.

First, the power consumption information collection unit 31 collects data on power consumption currently in use (S401).

Next, the power consumption information input unit 32 inputs the collected power consumption data (S402).

Next, the data encoding unit 33 encodes the input power consumption data (S403).

Next, the home appliance classification unit 34 classifies home appliances on the basis of the encoded data (S404), and the classification result output unit 35 outputs a result of the classification of the home appliances (S405).

The process of creating an RNN-based home appliance classification model and classifying home appliances will be described in detail as follows.

When the power consumption information collected from the customer's house is input, the input power consumption information of the customer's house is encoded. A method thereof is as follows.

When the power consumption information collected from the customer's house is input, the input power consumption information may be encoded using two methods.

The first encoding method is as follows.

A set of home appliances of a customer's house is represented as Appliance, and the number of home appliances is represented as N. When each of the home appliances in the set is represented as $app_i$ (1≤i≤N), the set of home appliances may be represented as follows:

$$\text{Appliance} = \{app_1, app_2, app_3, \ldots app_N\}. \quad \text{[Equation 1]}$$

When the collected power consumption is represented as P and the maximum power consumption of each home appliance is represented as $MAX(app_i)$, an equation that represents encoded power consumption is as follows:

$$\text{Encoded } P = \frac{P}{\sum_{i=1}^{N} MAX(app_i)}. \quad \text{[Equation 2]}$$

When additional sensor data is used as an input, the input value is divided by the maximum value of a sensor and then encoded in the similar way.

The second encoding method uses a low-pass filter.

A base of initial power consumption is set, and then a difference between the power consumption and the base value, that is, a variation therebetween is found using a low-pass filter.

The variation is multiplied by a filter value and then added to the original base value. The above-described work is sequentially applied to the entire learning data to encode the power consumption according to the variation for each time point.

Algorithm 1 of Table 1 shows a method of encoding data using a low pass filter.

TABLE 1

| data encoding with low pass filter |
|---|
| input :power consumption, lowpass filter value |
| output :output |
| 1:  p ← power consumption |
| 2:  lp← lowpass filter value |
| 3:  basis ← 0 |
| 4:  for i < number of p then do: |
| 5:       delta ← p[i] − basis |
| 6:       basis ← basis + (lp*delta) |
| 7:       output[i] ← delta |

Such a method has two advantages.

First, it is possible to minimize effect of noise that is mixed by an unknown electronic device when power consumption is collected from a customer's house because an absolute value of power consumption is not used.

Second, it is possible to classify home appliances having the same power consumption or combinations of the home appliances.

The reason is because variations change though the home appliances have the same power consumption.

Accordingly, the classification is possible in a wider variety of cases.

Figure 9A:
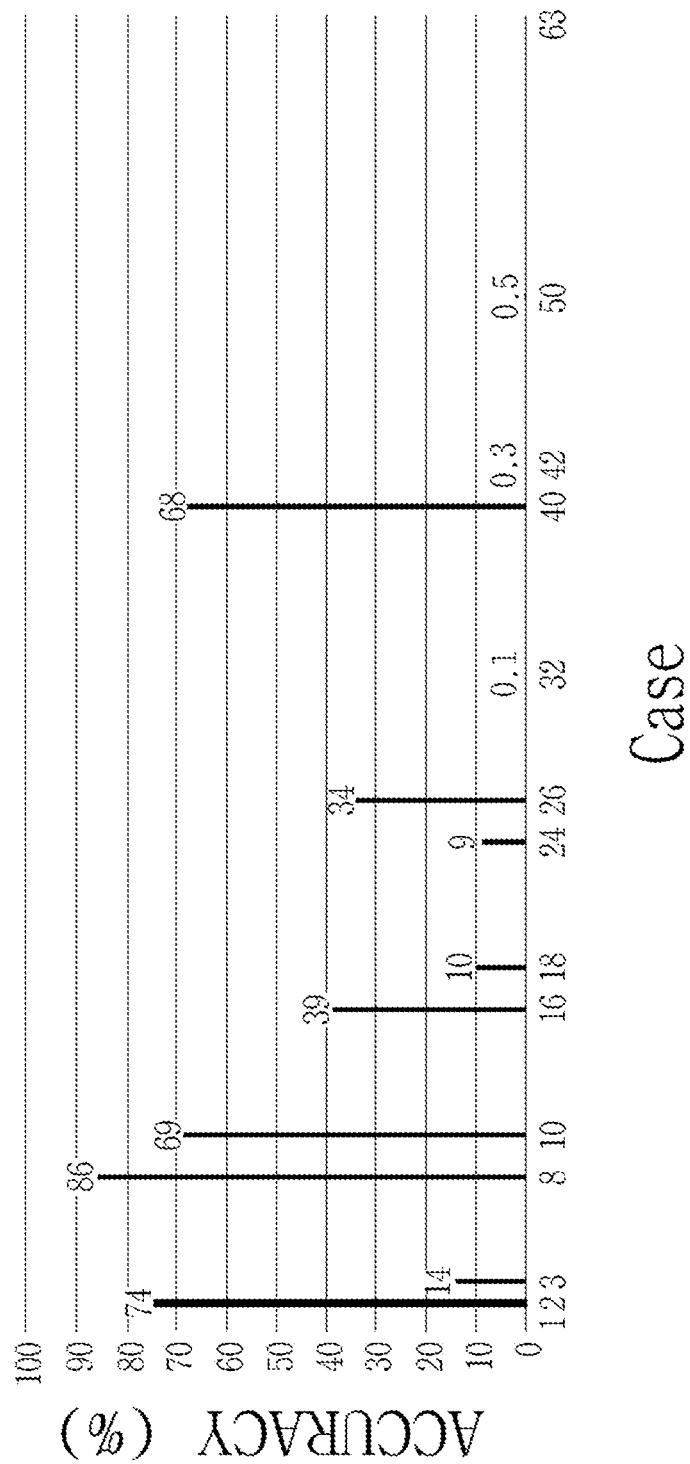
FIG. 9A is a graph showing a result of classification using power consumption.
Figure 9B:
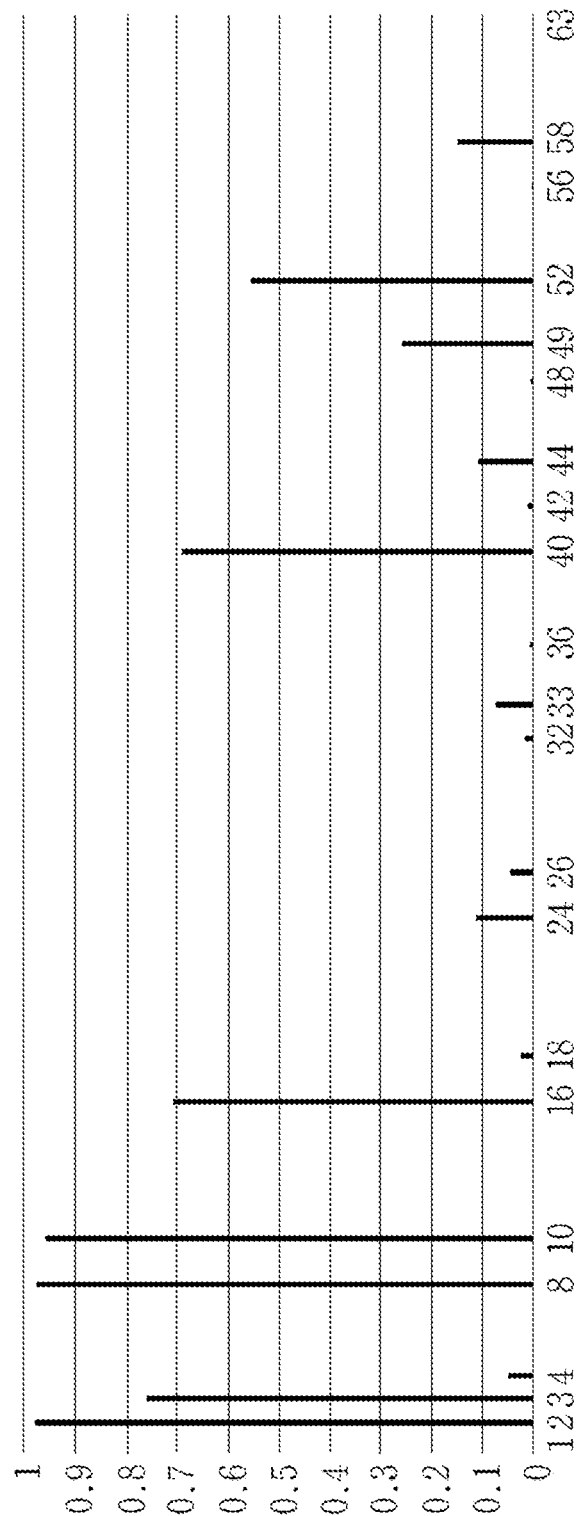
FIG. 9B is a graph showing a result of classification after removal of noise data from power consumption.
Figure 9C:
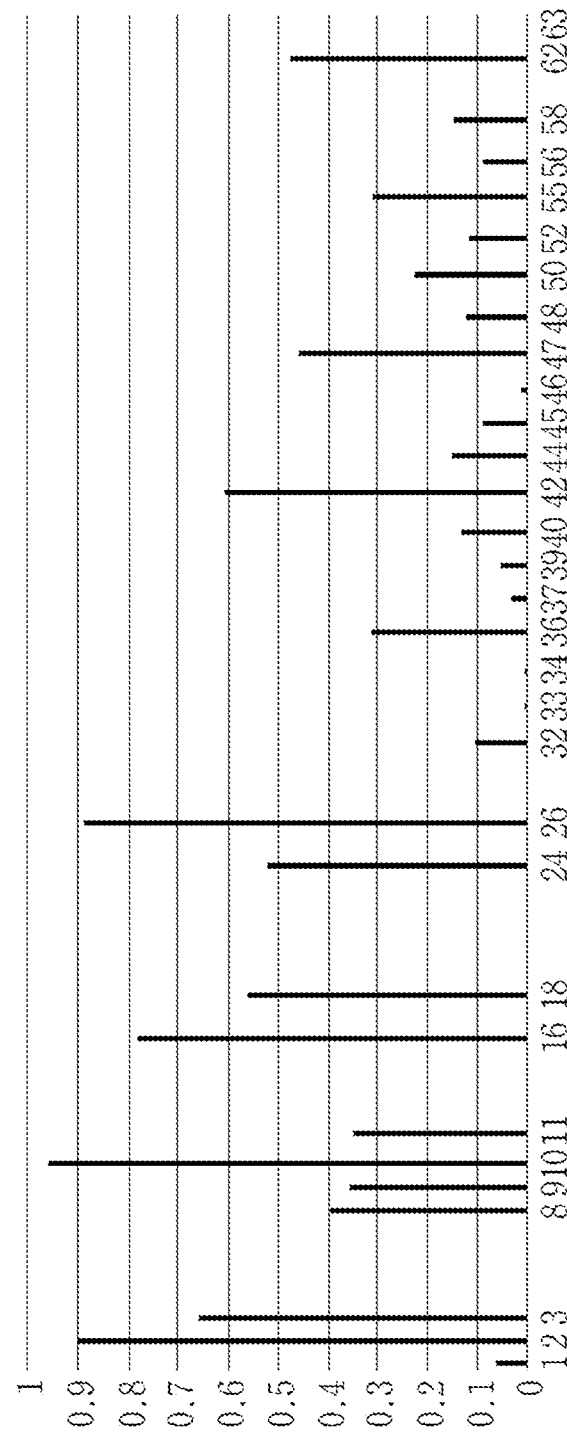
FIG. 9C is a graph showing a result of classification using a variation of power consumption, using a low pass filter.

FIGS. 9A to 9C are graphs showing classification accuracy of total 64 combinations of 6 home appliances.

Horizontal axis indicates a combination of home appliances, and vertical axis indicates accuracy.

FIG. 9A shows a result of classification using power consumption, and FIG. 9B shows a result of classification after removal of noise data from power consumption.

FIG. 9C shows a result of classification using a variation of power consumption, using a low pass filter.

It can be seen that it is possible to classify more combinations than those of FIGS. 9A and 9B when an encoding method that uses a low pass filter is used.

Also, since the number of pieces of input data may increase by using several low pass filters, it is possible to make a further sophisticated classification model.

A process of classifying home appliances with respect to input data based on the created home appliance classification model is as follows.

The method includes collecting data on power consumption currently in use and using the collected data as an input of the classification model.

The method includes encoding the data, classifying home appliances, and outputting a result of the classification.

Figure 5:
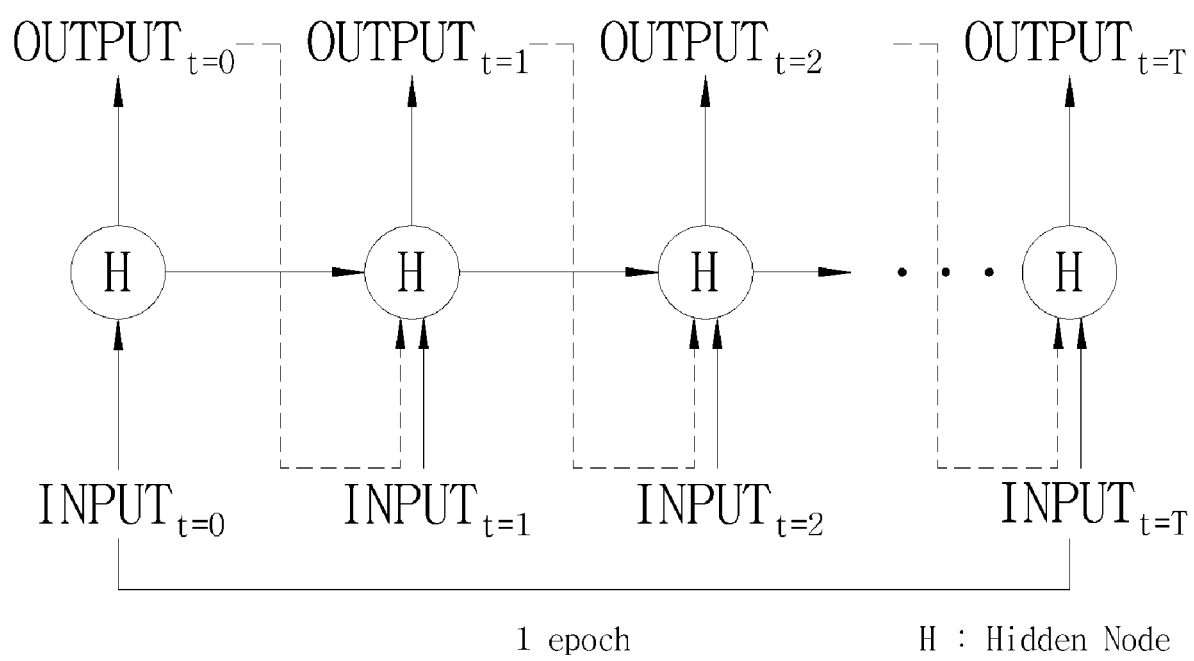
FIG. 5 is a block diagram showing a structure of an RNN with an improved input/output structure.

A structure of an RNN according to the present invention is as shown in FIG. 5.

In the RNN according to the present invention, an output at time t is used as an input at time t+1 in order to increase a learning rate for a home appliance use pattern.

In such a method, it is possible to increase correlation between a previous home appliance use pattern and a current home appliance use pattern.

In order to learn the model, the size of 1 epoch needs to be designated. Epoch is a unit of a set of input/output data that can be learned at one time. When an error is greater than a threshold after a model is learned during 1 epoch, the learning is performed during the next epoch.

The present invention provides two input/output data formats.

Figure 6:
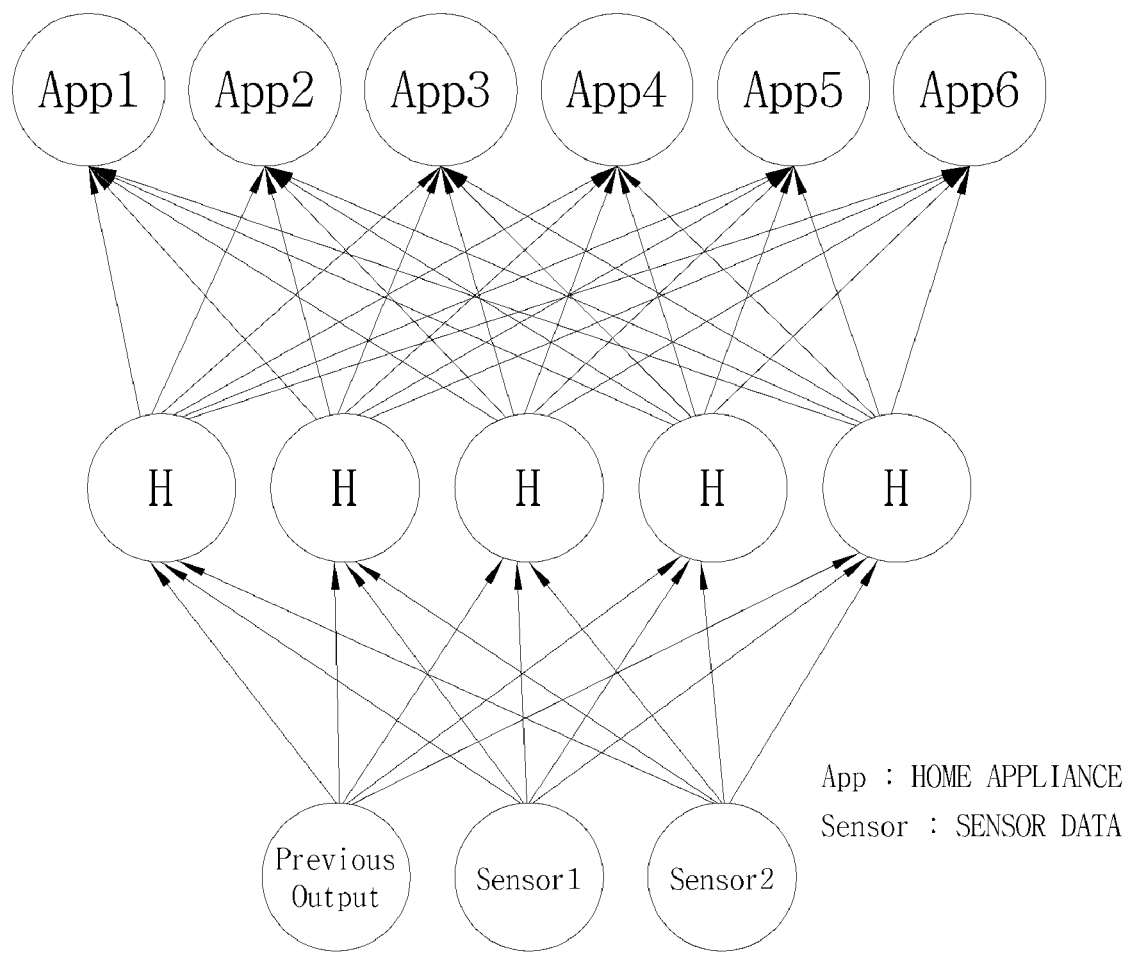
FIG. 6 is a block diagram showing an input/output data format of an RNN.

FIG. 6 shows an input/output data format of an RNN according to an embodiment of the present invention.

The input data is composed of a previous output and data collected from a sensor installed in a customer's house.

The previous output is binary data that is represented as one bit stream, converted into a decimal number, and then input.

The output data is composed of binary data that indicates an on/off state of a home appliance. Accordingly, the input/output data format is as follows:

Input:(previous output,sensor1data,sensor2data, sensor3data . . . )

Output:(appliance1state,appliance2state, appliance3state . . . )     [Equation 3]

For example, it is assumed that a set of home appliances is {computer, electric rice cooker, toaster, TV, washing machine, microwave oven, and electric fan}, and the number of sensors installed in the customer's house is three {power consumption, temperature, humidity}. When the microwave oven and the electric fan were turned on, and the toaster, the TV, and the electric fan are currently turned on, the input/output data is as follows:

Input data:(3,310 W,28° C.,65%)

Output data:(0,0,1,1,0,0,1).     [Equation 4]

Figure 7:
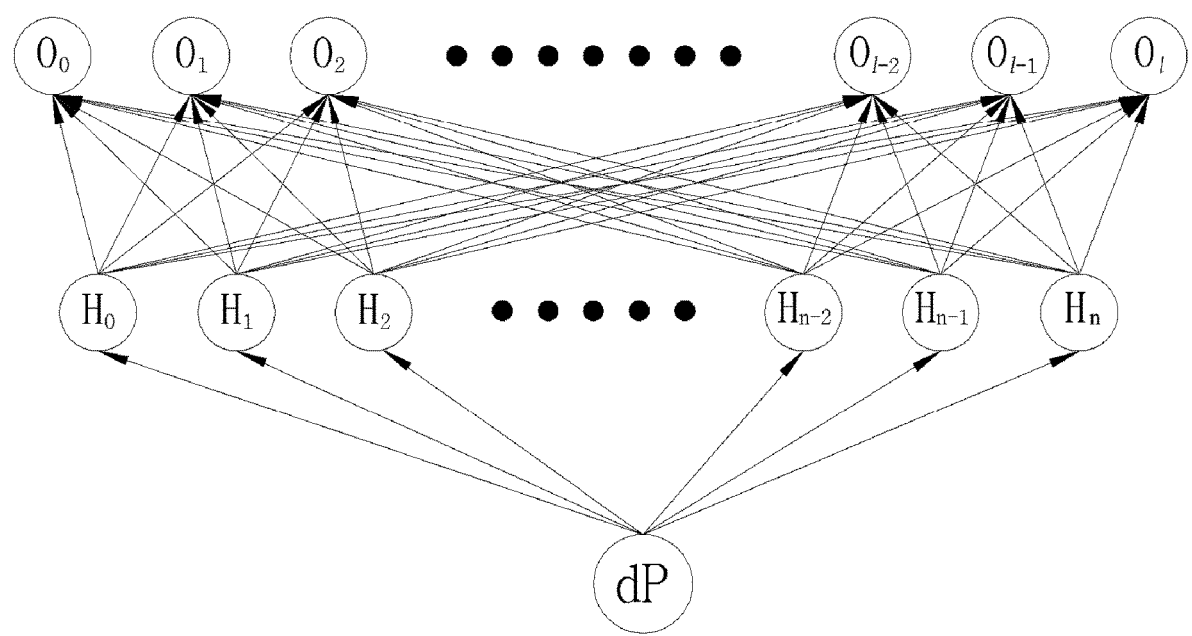
FIG. 7 is a block diagram showing an input/output data format of an RNN according to another embodiment of the present invention.

FIG. 7 shows an input/output data format of an RNN according to another embodiment of the present invention.

The input data may be power consumption collected from a sensor installed in the customer's house or a variation of power consumption that is encoded using a low pass filter.

Each output node is one of combinations of home appliances in the house.

For example, when a set of home appliances is {lamp and electric fan}, the number of output nodes is 4, which is the number of subsets of the set of home appliances. The nodes indicate states of {off}, {lamp}, {electric fan}, and {lamp and electric fan}.

A set of values of the output nodes may be {0, 1, 0, 0} when the lamp is turned on and {0, 0, 0, 1} when both the lamp and the electric fan are turned on.

An advantage of the method is that only one combination having the highest probability may be selected without needing to set a criterion for determining on/off states, when the model classifies home appliances.

Figure 8A:
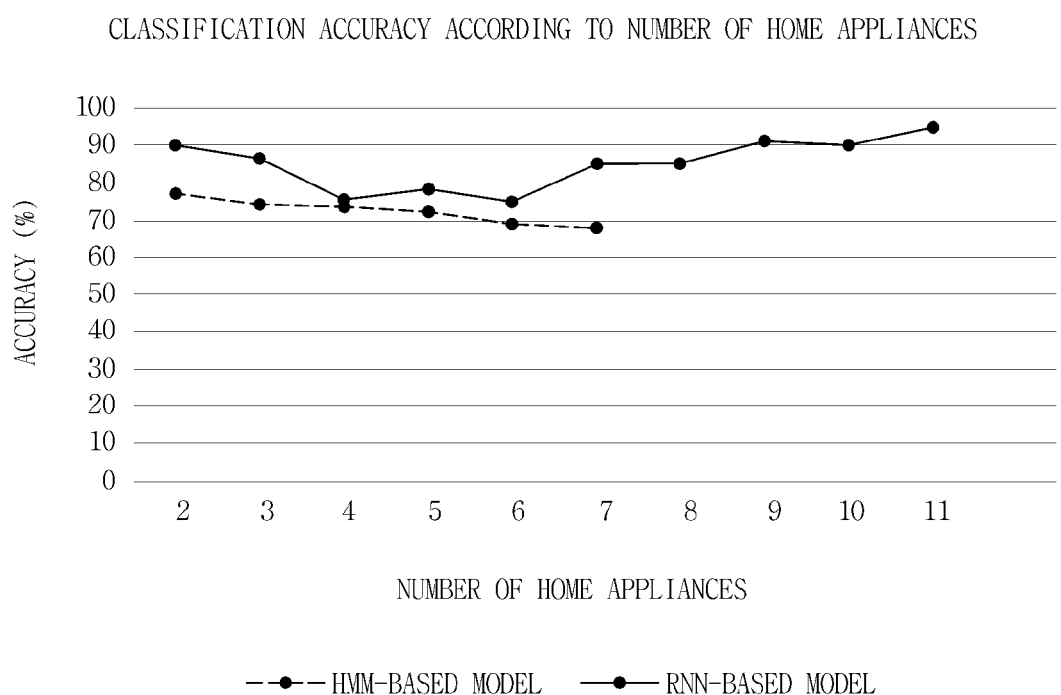
FIGS. 8A and 8B are graphs showing home appliance classification accuracy, which are obtained by applying an RNN-based home appliance classification model created using the model and the data format according to the present invention.

FIG. 8A is a graph for comparing accuracy between an HMM-based home appliance classification model and an RNN-based home appliance classification model to which the data structure proposed by the present invention is applied.

Accuracy of the RNN-based home appliance classification model was analyzed while increasing the number of home appliances. The analysis result shows that the accuracy increases as the number increases. It can be seen that the accuracy issue, which is one of the problems of the conventional model, has been improved.

Figure 8B:
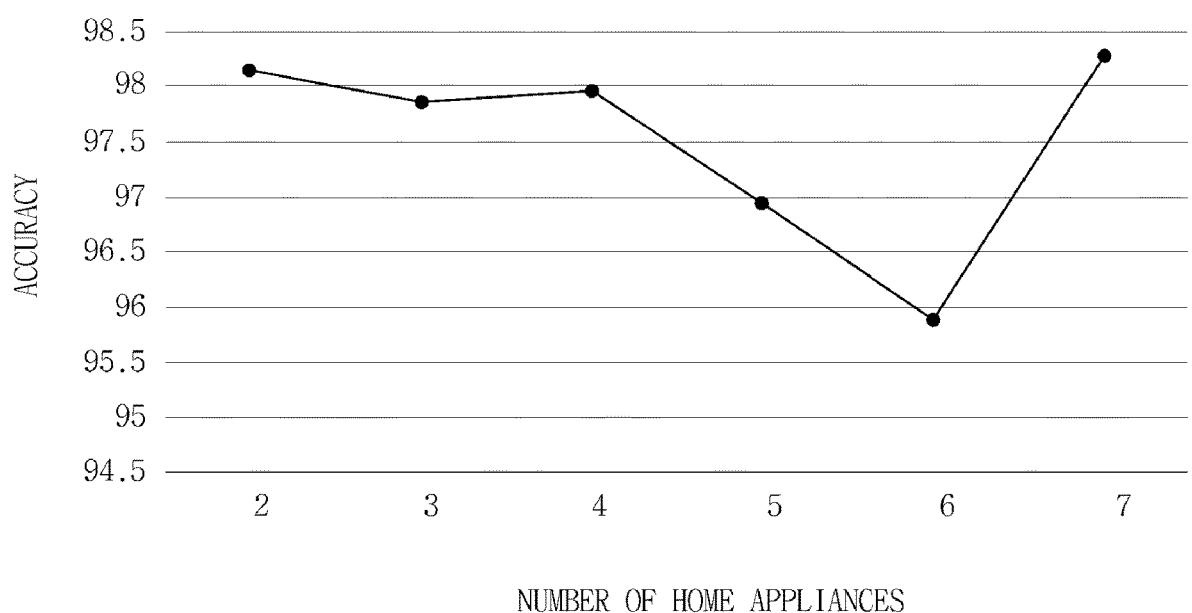

FIG. 8B shows a result of measuring accuracy while increasing the number of home appliances having multi-state power consumption through combinations of the home appliances.

It can be seen that the home appliances are classified with a high average accuracy of about 96%.

The aforementioned apparatus and method for classifying home appliances on the basis of power consumption using deep learning according to the present invention can increase accuracy of a home appliance classification model by applying a recurrent neural network (RNN)-enhanced model capable of sequential data pattern learning, among deep learning algorithms capable of high-level learning, and by designing a data structure appropriate for the network.

The apparatus and method for classifying home appliances based on power consumption using deep learning according to the present invention will be described as follows.

First, it is possible to efficiently classify home appliances currently in use by applying deep learning to analyze power data collected from a customer's house.

Second, it is also possible to increase accuracy of a home appliance classification model by applying a recurrent neural network (RNN)-enhanced model capable of sequential data pattern learning and designing a data structure appropriate for the network.

Third, it is also possible to create a home appliance classification model by providing a set of input/output data obtained during a certain period to an RNN to enable the RNN to learn the set of input/output data and learn a data pattern corresponding to the period at high level.

Fourth, it is also possible to solve a problem of decreasing accuracy as the number of home appliances increases when classifying the home appliances and a problem of decreasing classification accuracy when a home appliance having multi-state power consumption is modeled may be solved.

Fifth, it is also possible to increase usability of the present technique by increasing home appliance classification accuracy at the same time as solving the problems of the NILM models.

Sixth, it is also possible to further increase classification accuracy by enabling a multimodal type modeling that uses power consumption and also data of various sensors as input.

Seventh, it is also possible to increase accuracy by measuring a variation while updating a base value of power consumption with a low pass filter during a process of encoding power consumption information in order to create the home appliance classification model and by encoding a value of measured total power consumption according to the variation.

That is, it is possible to minimize effects of noise because an absolute value of power consumption is not used and also to enable classification of home appliances having the same power consumption or combinations of the home appliances.

It will be understood that the present invention may be implemented in a modified form without departing from essential characteristics of the present invention.

Therefore, the exemplary embodiments disclosed herein should be considered in an illustrative aspect rather than a restrictive aspect. The scope of the present invention should be defined not by the detailed description but by the appended claims, and all differences within the scope will be construed as being included in the present invention.

What is claimed is:

1. An apparatus for classifying home appliances based on power consumption using deep learning, the apparatus comprising:
one or more modules and units being configured and executed by a processor using an algorithm associated with at least one non-transitory storage device, the one or more modules and units comprising:
a home appliance classification model creation module configured to encode power consumption data collected from a customer's house to learn a home appliance classification model and create a recurrent neural network (RNN)-based home appliance classification model; and
a home appliance classification module configured to collect and encode data on power consumption currently in use, classify the home appliances using the home appliance classification model created by the home appliance classification model creation module, and output a result of the classification, wherein
the home appliance classification model creation module is configured to collect encoding power consumption data from a customer's house to learn the home appliance classification model and to create an RNN-based home appliance classification model,
to collect and to encode data on power consumption currently in use, and
to classify the home appliances using the RNN-based home appliance classification model, and to output a result of the classification, wherein
the collection of encoding power consumption data from a customer's house to learn the home appliance classification model and the creation of the RNN-based home appliance classification model is performed using the following algorithm:
a number of the home appliances are represented as N;
when each of the home appliances in the set is represented as $app_i$ (1≤i≤N), the set of home appliances is represented as $$Appliance=\{app_1, app_2, app_3, \ldots app_N\};$$

and
when the collected power consumption is represented as P, and the maximum power consumption of each home appliance is represented as $MAX(app_i)$, the encoded power consumption is $$\text{Encoded } P = \frac{P}{\sum_{i=1}^{N} MAX(app_i)},$$

and wherein
the home appliance classification model creation module is configured to measure a variation while updating a base value of the power consumption with a low pass filter and to encode a value of measured total power consumption according to the variation.

2. The apparatus of claim 1, wherein the home appliance classification model creation module comprises:
a learning data input unit configured to input the power consumption data collected from the customer's house;
a data encoding unit configured to encode the input power consumption data;
a home appliance classification model learning unit configured to learn the home appliance classification model using the encoded power consumption data; and
a home appliance classification model creation unit configured to input new learning data in response to detection of a learning error being greater than or equal to a threshold and to stop the learning and to create the home appliance classification model in response to detection of the learning error being less than the threshold.

3. The apparatus of claim 1, wherein the home appliance classification module comprises:
   a power consumption information collection unit configured to collect the data on power consumption currently in use;
   a power consumption information input unit configured to input the collected power consumption data;
   a data encoding unit configured to encode the input power consumption data;
   a home appliance classification unit configured to classify the home appliances based on the encoded data; and
   a classification result output unit configured to output the result of the classification of the home appliances.

4. A method of classifying home appliances based on power consumption using deep learning, the method comprising:
   encoding power consumption data collected from a customer's house to learn a home appliance classification model and creating an RNN-based home appliance classification model; and
   collecting and encoding data on power consumption currently in use,
   classifying the home appliances using the RNN-based home appliance classification model, and outputting a result of the classification, wherein
   in the encoding of the input power consumption information included in the creating of the RNN-based home appliance classification model:
   a set of the home appliances of the customer's house is represented as Appliance;
   a number of the home appliances are represented as N;
   when each of the home appliances in the set is represented as $app_i$ ($1 \leq i \leq N$), the set of home appliances is represented as Appliance={$app_1$, $app_2$, $app_3$, . . . $app_N$};

and
   when the collected power consumption is represented as P, and the maximum power consumption of each home appliance is represented as MAX($app_i$), the encoded power consumption is $$\text{Encoded } P = \frac{P}{\sum_{i=1}^{N} \text{MAX}(app_i)},$$

and wherein
   the encoding of the input power consumption information included in the creating of the RNN-based home appliance classification model comprises measuring a variation while updating a base value of the power consumption with a low pass filter and encoding a value of measured total power consumption according to the variation.

5. The method of claim 4, wherein the creating of the RNN-based home appliance classification model comprises:
   inputting the power consumption information collected from the customer's house;
   encoding the input power consumption data;
   learning a home appliance classification model using the encoded power consumption data; and
   inputting new learning data in response to detection of a learning error being greater than or equal to a threshold and stopping the learning and creating the home appliance classification model in response to detection of the learning error being less than the threshold.

6. The method of claim 4, wherein the classifying of home appliances and the outputting of a result of the classification comprises:
   collecting data on power consumption currently in use;
   inputting the collected power consumption data;
   encoding the input power consumption data;
   classifying the home appliances using the RNN-based home appliance classification model based on the encoded data; and
   outputting the result of the classification of the home appliances.

7. The method of claim 4, wherein, in the encoding of the input power consumption information included in the creating of the RNN-based home appliance classification model, an output at time t is used as an input at time t+1 in order to increase a learning rate for a home appliance use pattern.

8. The method of claim 4, wherein, in the classifying of the home appliances using the RNN-based home appliance classification model and the outputting of the result of the classification,
   input data is composed of a previous output and data collected from a sensor installed in the customer's house, in which the previous output is binary data that is represented as one bit stream, converted into a decimal number, and then input; and
   output data is composed of binary data that indicates an on/off state of a home appliance.

9. The method of claim 4, wherein, in the classifying of the home appliances using the RNN-based home appliance classification model and the outputting of the result of the classification,
   input data is power consumption collected from a sensor installed in the customer's house or a variation of power consumption that is encoded using a low pass filter;
   an output node is one of combinations of the home appliances in the customer's house; and
   only one combination having the highest probability is selected without needing to set a criterion for determining on/off states when the model classifies the home appliances.

* * * * *